(12) United States Patent
Hwang et al.

(10) Patent No.: US 9,152,560 B2
(45) Date of Patent: Oct. 6, 2015

(54) DATA MANAGEMENT METHOD FOR NONVOLATILE MEMORY

(75) Inventors: Joo-Young Hwang, Suwon-si (KR); Chul Lee, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 495 days.

(21) Appl. No.: 13/556,243

(22) Filed: Jul. 24, 2012

(65) Prior Publication Data

US 2013/0080686 A1 Mar. 28, 2013

(30) Foreign Application Priority Data

Sep. 23, 2011 (KR) .......................... 10-2011-0096370

(51) Int. Cl.
*G06F 12/10* (2006.01)
*G06F 12/02* (2006.01)

(52) U.S. Cl.
CPC ............ *G06F 12/0292* (2013.01); *G06F 12/10* (2013.01); *G06F 2212/205* (2013.01)

(58) Field of Classification Search
CPC ............ G06F 12/0223; G06F 12/0238; G06F 12/0246; G06F 12/0253; G06F 12/0284; G06F 12/0292; G06F 12/10; G06F 2212/205

USPC .................. 711/103, 202, 203, 206
See application file for complete search history.

(56) References Cited

U.S. PATENT DOCUMENTS 6,282,605 B1 * 8/2001 Moore .......................... 711/103
7,509,474 B2 * 3/2009 Wong ............................ 711/206
2010/0106895 A1 4/2010 Condit et al.

FOREIGN PATENT DOCUMENTS

| KR | 1020060085899 A | 7/2006 |
| KR | 1020090042077 A | 4/2009 |
| KR | 1020090066071 A | 6/2009 |

* cited by examiner

*Primary Examiner* — Jared Rutz
*Assistant Examiner* — Mehdi Namazi
(74) *Attorney, Agent, or Firm* — Volentine & Whitt, PLLC

(57) ABSTRACT

A method of managing data in a system including a nonvolatile memory includes storing a root object of application data, and at least one sub object referenced by the root object in the nonvolatile memory, and mapping virtual addresses of the root object and sub object to physical addresses of the nonvolatile memory respectively, in a page unit. The root object stored in the nonvolatile memory includes a pointer that references the sub object stored in the nonvolatile memory.

17 Claims, 9 Drawing Sheets

|  | PTAB | | |
|---|---|---|---|
| pte0 | VA_R | PA_R | PERM |
| pte1 | VA_A | PA_A | PERM |
| pte2 | VA_B | PA_B | PERM |

| | | PTAB | |
|---|---|---|---|
| pte0 | VA_R | PA_R | PERM |
| pte1 | | | |
| pte2 | | | |
| pte3 | VA_A | PA_A | PERM |
| pte4 | VA_B | PA_B | PERM |

PTAB

| | | | |
|---|---|---|---|
| pte0 | VA_R | PA_R | PERM |
| pte1 | VA_A | PA_A | PERM |
| pte2 | VA_B | PA_B | PERM |
| pte3 | VA_C | PA_C | PERM |
| pte4 | VA_D | PA_D | PERM |
| | ⋮ | | |

FIG. 12

VAS

| | |
|---|---|
| PAGE=0 | R |
| PAGE=1 | A |
| PAGE=2 | B |
| PAGE=3 | C |
| PAGE=4 | D |
| | ⋮ |

PTAB

| | | | | |
|---|---|---|---|---|
| pte0 | VA_R | PA_R | PERM | NULL |
| pte1 | VA_A | PA_A | PERM | VA_R |
| pte2 | VA_B | PA_B | PERM | VA_R |
| pte3 | VA_C | PA_C | PERM | VA_A |
| pte4 | VA_D | PA_D | PERM | VA_A |

FIG. 16

DATA MANAGEMENT METHOD FOR NONVOLATILE MEMORY

CROSS-REFERENCE TO RELATED APPLICATIONS

This application claims priority under 35 U.S.C. §119 to Korean Patent Application No. 10-2011-0096370 filed on Sep. 23, 2011, the subject matter of which is hereby incorporated by reference.

BACKGROUND OF THE INVENTION

The inventive concept relates generally to electronic data storage technologies. More particularly, the inventive concept relates to methods of managing data in a system comprising a nonvolatile memory.

Computing systems typically include multiple different types of memory for providing different levels of data storage. For example, most computing systems comprise a long-term memory designed to provide long-term data storage, and a working memory (or main memory) designed to temporarily store data used to perform current operations. The long-term memory typically comprises some form of nonvolatile memory, such as a hard disk drive (HDD), a solid state drive (SSD), or a flash memory, for example. The temporary memory typically comprises a volatile memory such as a dynamic random access memory (DRAM) or a static random access memory (SRAM).

In a typical computing system, the long-term memory stores operating system (OS) and application code to be loaded to the main memory during execution. It also may store various forms of user data. The main memory, on the other hand, stores OS and application code during execution, as well as data generated or used by the OS and application code during execution. The main memory may also temporarily store user data or other types of data to be manipulated by or used by the OS or executing applications.

Data may be stored in the long-term memory or the main memory using different types of data structures. For example, one type of memory may store data in a tree structure, while another type of memory may store data in a linear structure. The use of different data structures may require conversion to be performed when data, such as application data, is transferred from one memory to another. In addition, the use of different data structures or other features may also require each of the different memories to be controlled by a different OS. These and other complications can potentially reduce system performance.

SUMMARY OF THE INVENTION

In one embodiment of the inventive concept, a method manages data in a system comprising a nonvolatile memory. The method comprises storing a root object of application data, and at least one sub object referenced by the root object in the nonvolatile memory, and mapping virtual addresses of the root object and sub object to physical addresses of the nonvolatile memory respectively, in a page unit. The root object stored in the nonvolatile memory comprises a pointer that references the sub object stored in the nonvolatile memory.

In another embodiment of the inventive concept, a method manages data in a system comprising a nonvolatile memory. The method comprises receiving application data comprising a root object, and at least one sub object that is referenced by the root object, and storing the root object and the sub object of the application data in the nonvolatile memory. The root object stored in the nonvolatile memory includes a pointer for referencing the sub object stored in the nonvolatile memory.

In another embodiment of the inventive concept, a system comprises a processor configured to execute an application using application data, and a nonvolatile memory configured to store a root object of application data, and at least one sub object referenced by the root object, wherein the root object stored in the nonvolatile memory comprises a pointer that references the sub object stored in the nonvolatile memory. The processor maps virtual addresses of the root object and sub object to physical addresses of the nonvolatile memory respectively, in a page unit.

These and other embodiments of the inventive concept can potentially improve performance, space usage, and data access regulation in nonvolatile memory devices.

BRIEF DESCRIPTION OF THE DRAWINGS

The drawings illustrate selected embodiments of the inventive concept. In the drawings, like reference numbers indicate like features.

DETAILED DESCRIPTION

Selected embodiments of the inventive concept are described below with reference to the accompanying drawings. These embodiments are presented as teaching examples and should not be construed to limit the scope of the inventive concept.

As used herein, the term "and/or" indicates any and all combinations of one or more of the associated listed items.

Expressions such as "at least one of," when preceding a list of elements, modify the entire list of elements and do not modify the individual elements of the list.

Figure 1:
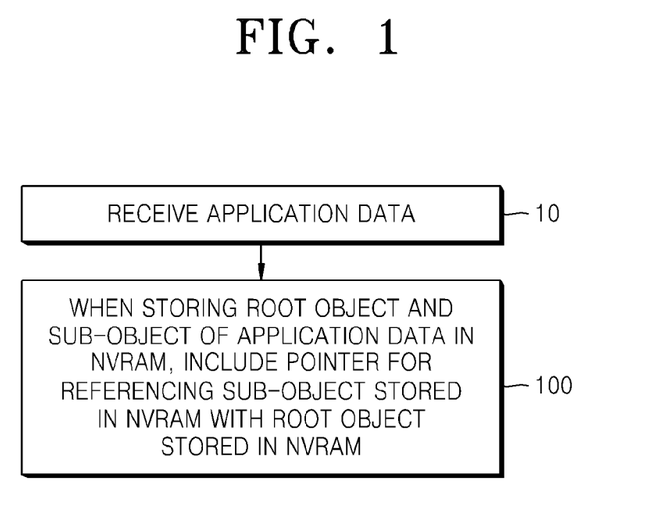
FIG. 1 is a flowchart illustrating a data management method according to an embodiment of the inventive concept.
Figure 2:
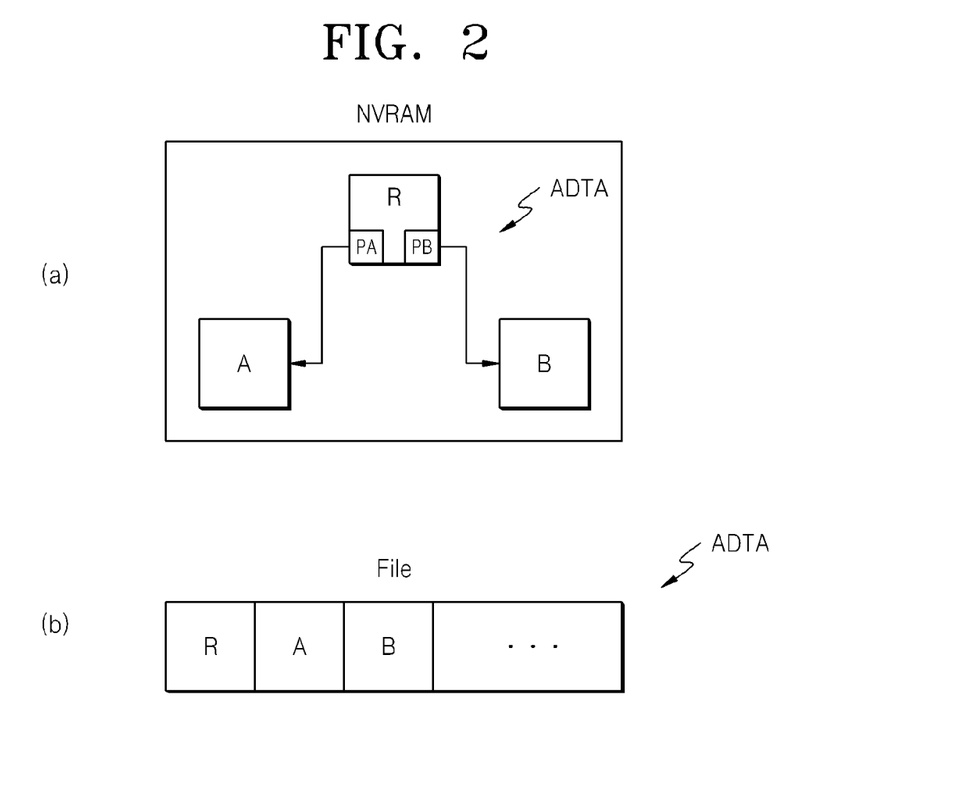
FIGS. 2A and 2B are diagrams illustrating different ways of storing application data in a system using the data management method of FIG. 1.
Figure 3:
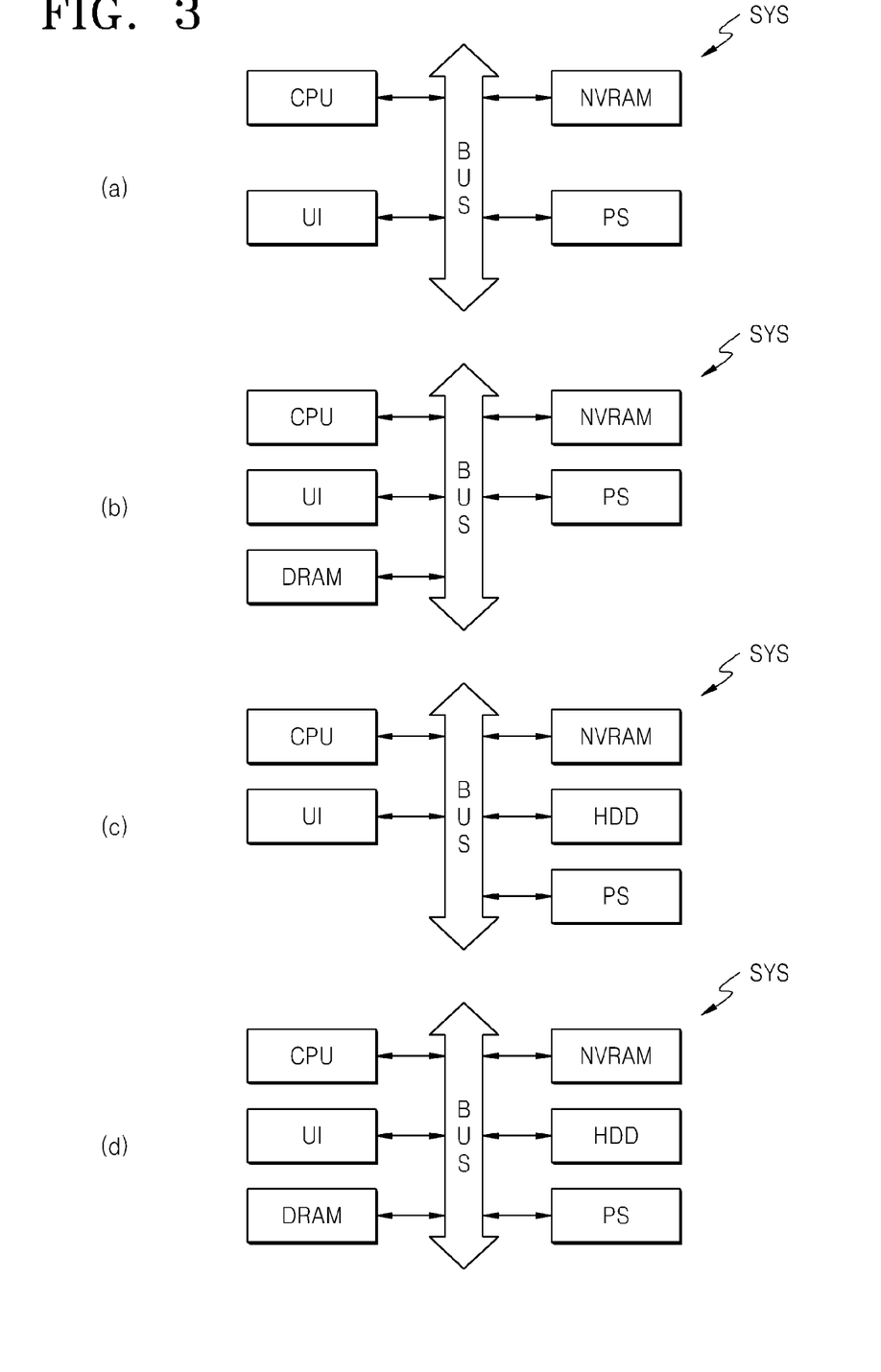
FIGS. 3A through 3D are diagrams illustrating examples of a system employing the data management method of FIG. 1.

FIG. 1 is a flowchart illustrating a data management method according to an embodiment of the inventive concept. FIGS. 2A and 2B are diagrams illustrating different ways of storing application data in a system using the data management method of FIG. 1. FIGS. 3A through 3D are diagrams illustrating examples of different systems that can be used to perform the method of FIG. 1. In the description that follows, example method steps are indicated by parentheses (XXX).

Referring to FIG. 1, a system SYS generates or receives application data ADTA comprising at least a root object R and sub objects A and B (10). For example, the application data may be generated by an application running on a processor CPU within system SYS. Next, application data ADTA is transmitted to a nonvolatile memory NVRAM within system SYS, and root object R and sub objects A and B are stored in the nonvolatile memory NVRAM (100). Root object R comprises pointers PA and PB that refer to respective sub objects A and B stored in nonvolatile memory NVRAM.

Referring to FIGS. 2A and 2B, application data ADTA may be stored using different types of data structures according to the location where it is stored in system SYS. For example, as illustrated in FIG. 2A, application data ADTA may be stored in a tree structure using pointers PA and PB when it is stored in nonvolatile memory NVRAM. Alternatively, as illustrated in FIG. 2B, application data ADTA may be stored using a linear structure when stored in an external storage device, such as an HDD. Due to these different types of data structures, data conversion may be required when transferring application data ADTA between nonvolatile memory NVRAM and an external storage device. Such data conversion may require, for example, serializing and/or marshalling the data.

Referring to FIGS. 3A through 3D system SYS may be implemented in alternative configurations where nonvolatile memory NVRAM functions as a main memory, an external storage device, or both. For example, nonvolatile memory NVRAM may be used as an external storage device for long-term storage of application data ADTA, or as a main memory providing an interface for transmitting application data ADTA between a processor CPU and the external storage device. In addition, system SYS may be implemented with additional forms of memory, such as a DRAM, an HDD, or both.

In the example of FIG. 3A, system SYS comprises nonvolatile memory NVRAM, processor CPU, a user interface UI, and a power supply PS that are connected to a bus BUS. Nonvolatile memory NVRAM functions as a main memory and an external storage device of system SYS. During typical operation, processor CPU loads application data ADTA in nonvolatile memory NVRAM to execute an application, or it may store application data ADTA on a long-term basis in nonvolatile memory NVRAM.

In general, system SYS may include one or more buses. For example, bus BUS may be interpreted to include different buses, such as a first bus connecting a main memory to processor CPU, a second bus connecting an external storage device to processor CPU, and so on.

Processor CPU controls execution of an application that uses application data ADTA. The application data may be generated internally by system SYS, or it may be received via user interface UI. Power supply PS supplies electric power required to operate system SYS. Processor CPU, user interface UI, and power supply PS perform substantially the same functions in each of the examples shown in FIGS. 3A through 3D.

In the example of FIG. 3B, system SYS comprises nonvolatile memory NVRAM, processor CPU, user interface UI, power supply PS, and a main memory DRAM, all connected to bus BUS. Nonvolatile memory NVRAM functions as an external storage device for providing long-term data storage in system SYS, and main memory DRAM is used as a main memory for providing temporary data storage. Accordingly, nonvolatile memory NVRAM stores application data ADTA on a long-term basis. Application data ADTA can be directly loaded into nonvolatile memory NVRAM to execute an application in system SYS of FIG. 3B, and nonvolatile memory NVRAM may perform parallel operations with main memory DRAM.

In the example of FIG. 3C, system SYS comprises nonvolatile memory NVRAM, processor CPU, user interface UI, power supply PS, and an external storage device HDD, all connected to bus BUS. Nonvolatile memory NVRAM functions as a main memory of system SYS.

Processor CPU controls transmission/receipt of application data ADTA to/from external storage device HDD via nonvolatile memory NVRAM. For example, processor CPU may load application data ADTA in a tree structure in nonvolatile memory NVRAM, and may perform serialization or marshalling of application data ADTA with a file type corresponding to a stream structure to store application data ADTA in external storage device HDD. Otherwise, processor CPU may load application data ADTA with the file type stored in external storage device HDD of FIG. 3C into nonvolatile memory NVRAM, and then perform deserializing or unmarshalling to convert the file into application data ADTA having the tree structure to execute the application. In addition, in system SYS of FIG. 3C, nonvolatile memory NVRAM may store application data ADTA in external storage device HDD. For example, processor CPU may recognize nonvolatile memory NVRAM as a second external storage device, and then, may store application data ADTA in the external storage device HDD or nonvolatile memory NVRAM.

In the example of FIG. 3D, system SYS comprises nonvolatile memory NVRAM, processor CPU, user interface UI, power supply PS, main memory DRAM, and external storage device HDD connected to bus BUS. Nonvolatile memory NVRAM of FIG. 3D may exclusively perform functions of the main memory or the external storage device, or it may perform functions with another main memory or another external storage device in parallel, as shown in FIG. 3B or 3C.

System SYS shown in FIGS. 3A through 3D can take various alternative forms, such as a computer system, a mobile system, an electronic system, a server system, or a memory system, for example. Where system SYS is a mobile device, a battery for supplying an operating voltage and a modem such as a baseband chipset may be additionally provided. In addition, system SYS may further comprise other features not shown in the drawings, such as an application chipset, a camera image processor (CIS), and a mobile DRAM.

In the embodiments of FIGS. 1 through 3D, application data ADTA is typically transmitted from an application executed by system SYS, and application data ADTA is organized with a tree structure including root object R and sub objects A and B.

In the data management method of FIG. 1, application data ADTA may be stored in nonvolatile memory NVRAM with the tree structure and then provided to processor CPU for execution without converting it into a file having a stream structure through a marshalling operation. Similarly, application data ADTA may be stored back into nonvolatile memory NVRAM without requiring an unmarshalling operation. These capabilities eliminate overhead produced by the marshalling and the unmarshalling operations, which can potentially improve the input/output (I/O) performance of system SYS as well as spatial efficiency of nonvolatile memory NVRAM.

Figure 4:
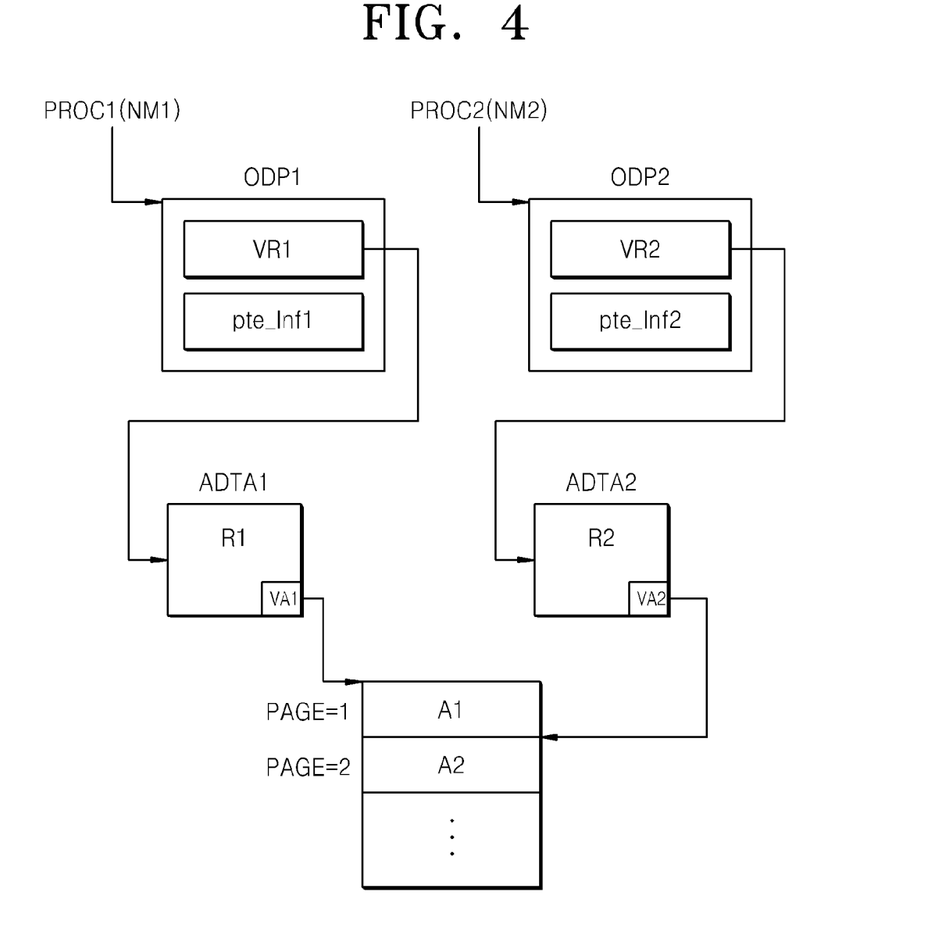
FIG. 4 is a diagram illustrating a method of assigning a page of objects in application data within the data management method of FIG. 1.

FIG. 4 is a diagram illustrating a method of assigning a page of objects in application data ADTA within the data management method of FIG. 1.

Referring to FIGS. 1 through 4, in the data management method, first application data ADTA1 having a first name NM1 is used by a first process PROC1 and second application data ADTA2 having a second name NM2 is used by a second process PROC2. Otherwise, first application data ADTA1 and second application data ADTA2 may be used by the same process, namely, first or second process PROC1 or PROC2.

The name assigned to each of first and second application data ADTA1 and ADTA2 is stored in a certain region of nonvolatile memory NVRAM, such as a region storing metadata. Where the corresponding application data is to be accessed, processor CPU (or an operating system (not shown) operated by processor CPU) searches for the names of first and second application data ADTA1 and ADTA2 stored in nonvolatile memory NVRAM to check whether the corresponding application data is stored in nonvolatile memory NVRAM.

Where there is a request to access each of first and second application data ADTA1 and ADTA2, an object descriptor ODP1 or ODP2 of each application data ADTA1 or ADTA2 may be accessed first. Object descriptors ODP1 and ODP2 may include respective pointers VR1 and VR2 for accessing root objects R1 and R2, or they may include respective root objects R1 and R2 for application data ADTA1 or ADTA2. In addition, object descriptors ODP1 and ODP2 may include mapping information pte_inf1 or pte_inf2 representing mapping relationships between a virtual address and a physical address of a sub object A1 or A2 referred to by root object R1 or R2. Root object R1 of first application data ADTA1 further comprises a pointer VA1 referencing sub object A1, and root object R2 of second application data ADTA2 may include a pointer VA2 referencing sub object A2.

In the embodiment of FIG. 4, pointers VR1 and VR2 of root objects R1 and R2 and pointers VA1 and VA2 of sub objects A1 and A2 referenced by the root objects R1 and R2 represent virtual addresses, which may be different from pointers PA1 and PA2 shown in FIG. 2A that are represented as physical addresses. The physical address of nonvolatile memory NVRAM is accessed as the virtual address, and accordingly the mapping information pte_inf1 or pte_inf2 representing the mapping relationship between the virtual address and the physical address of the object is necessary. As indicated above, mapping information pte_inf1 or pte_inf2 regarding the objects in opened application data ADTA1 or ADTA2 is included in object descriptors ODP1 and ODP2.

Object descriptors ODP1 and ODP2 and mapping information pte_inf1 and pte_inf2 in object descriptors ODP1 and ODP2 are described in further detail below. When referring to the object descriptor and related mapping information shown in FIG. 4, the object descriptor and the mapping information may be briefly represented by reference characters ODP and pte_inf.

Sub-objects A1 and A2 are assigned to different pages from each other. In the example shown in FIG. 4, sub object A1 of first application data ADTA1 is assigned to a first page (PAGE=1), and sub object A2 of second application data ADTA2 is assigned to a second page (PAGE=2). Here, a page (PAGE) may be a unit for mapping the virtual address of each object to the physical address in the nonvolatile memory. For example, the page may have a size of 4 KB.

In the data management method of FIG. 4, sharing of a page between different objects is prohibited. Because the mapping is performed in the page unit, if a plurality of objects are assigned to one page and access to one of the objects assigned to the same page is granted, the access to the other objects assigned to the same page may be granted regardless of whether the access is prohibited. In the example of FIG. 4, if sub object A1 of first application data ADTA1 and sub object A2 of second application data ADTA2 are assigned to the same page (for example, PAGE=1), even where the access to sub object A1 of first application data ADTA1 is not granted, because the mapping is performed in the page unit, second process PROC2 may access the corresponding page (for example, PAGE=1) where the access to sub object A2 of second application data ADTA2 is granted. Therefore, sub object A1 of first application data ADTA1 may be accessed. However, the sharing of a page between different objects is prohibited, and therefore access to the object by a process having a different access right may be prevented. Here, the access right may be the right of reading the corresponding object, reading and writing the corresponding object, or executing the corresponding object, for example.

Figure 5:
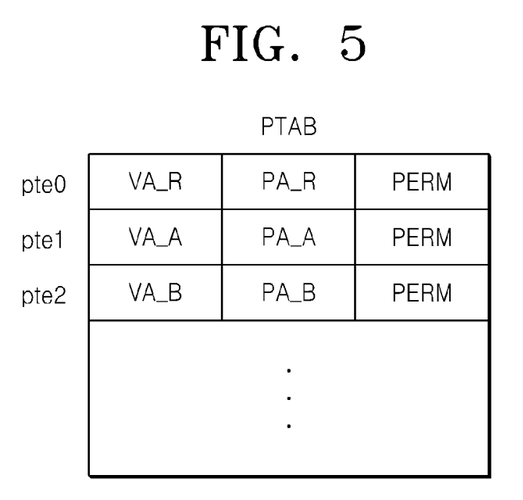
FIG. 5 is a diagram illustrating an example of a page mapping table PTAB representing mapping relationships between virtual addresses and physical addresses of application data according to the embodiment of the inventive concept.
Figure 6:
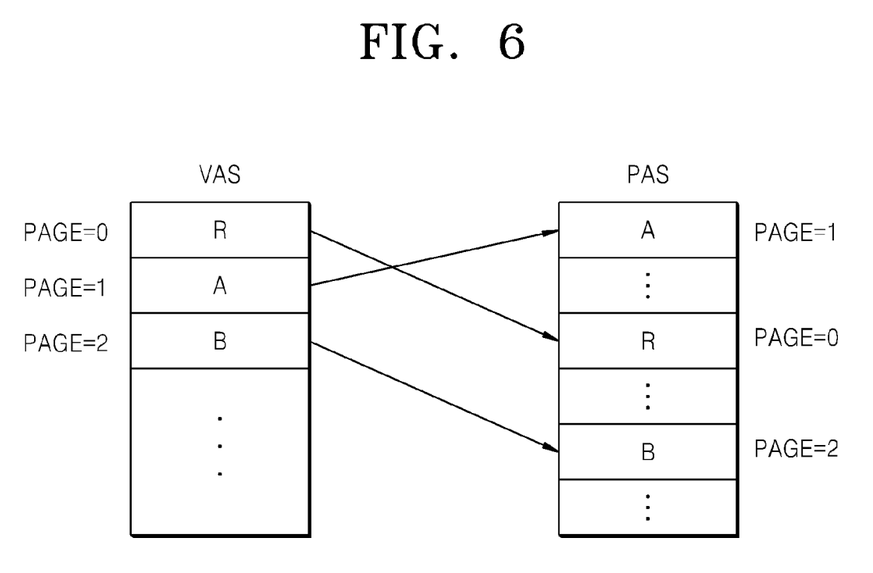
FIG. 6 is a diagram illustrating mapping relationships defined by the page mapping table shown in FIG. 5.

FIG. 5 is a diagram illustrating an example of a page mapping table PTAB, which represents mapping relationships between virtual addresses and physical addresses of the application data, according to the embodiment of the inventive concept. FIG. 6 is a diagram illustrating mapping relationships according to the page mapping table PTAB shown in FIG. 5. The concepts described in relationship to FIGS. 5 and 6 can be used in the data management method of FIG. 4 to map virtual and physical addresses of objects.

Referring to FIGS. 5 and 6, page mapping table PTAB comprises page mapping entries (pte) respectively corresponding to the pages. In addition, each of first, second, and third page mapping entries pet0, pet1, and pte2 comprises the virtual address and the physical address of the object assigned to the corresponding page (PAGE), and access rights to the corresponding object. For example, first page mapping entry pte0 comprises a virtual address VA_R of object R assigned to the first page (PAGE=0), and a physical address PA_R mapped with virtual address VA_R. In addition, the first page mapping entry pte0 comprises access right PERM to object R assigned to the first page (PAGE=0).

Similarly, second page mapping entry pte1 comprises a virtual address VA_A and a physical address PA_A of an object A assigned to a second page (PAGE=1), and access right PERM. In addition, third page mapping entry pte2 comprises a virtual address VA_B and a physical address PA_B of an object B assigned to a third page (PAGE=2), and access right PERM.

The conversion of the virtual address into the physical address according to the above object mapping and the access to the object may be controlled by a memory management unit (MMU) (not shown). For example, the MMU may convert the virtual address into the physical address with respect to each of the objects, and it may control the access grant to each of the objects with reference to the page mapping entries. The MMU may be supported by processor CPU of system SYS shown in FIG. 3, which manages the data that may be permanently stored in the nonvolatile memory according to the data management method.

Figure 7:
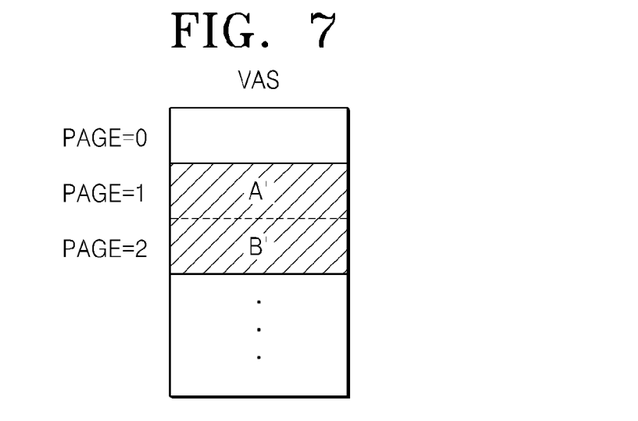
FIG. 7 is a diagram illustrating an example of a page conflict in the data management method of FIG. 1.

A region or a size of the memory that may be used by the process is generally limited, so another application data may be mapped on a page that is mapped earlier. As illustrated in FIG. 4, where application data ADTA is opened (requested), a determination is made as to whether the page is used with respect to each of the objects while scanning each of the objects with reference to the object descriptor ODP of application data ADTA. For example, where application data ADTA that is mapped (e.g., as in FIGS. 5 and 6) is opened, it may be determined whether the page (PAGE=1) to which sub object A is assigned and the page (PAGE=2) to which sub object B is assigned are used with respect to other objects A' and B', as shown in FIG. 7.

Figure 8:
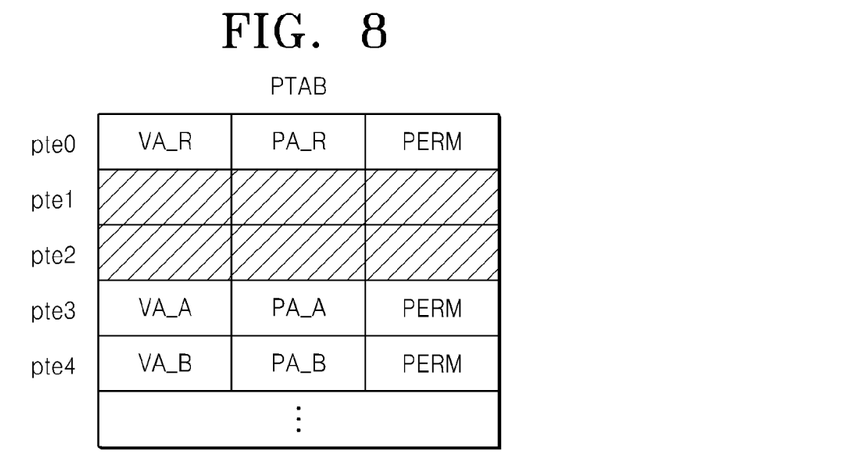
FIGS. 8 and 9 are diagrams illustrating an example of a remapping method for handling page conflicts of application data in the data management method of FIG. 1.
Figure 9:
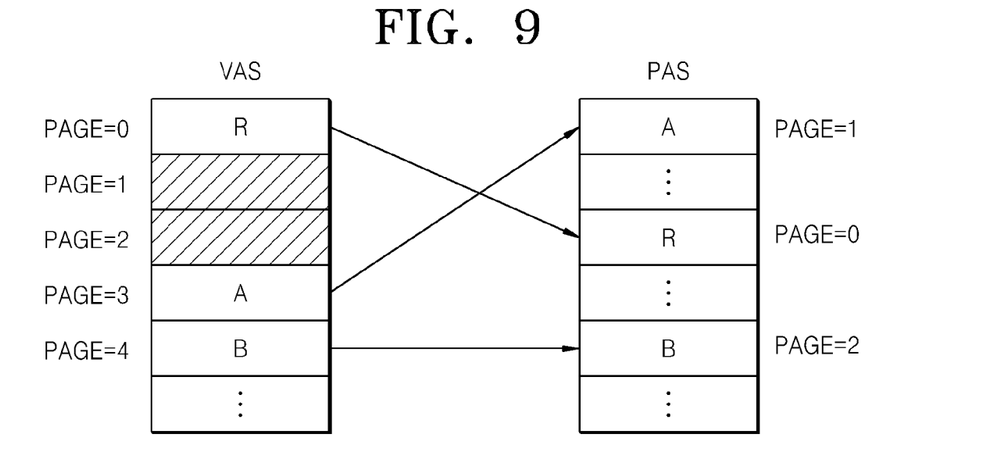

FIGS. 8 and 9 are diagrams illustrating an example of a remapping method for handling page conflicts of application data in the data management method of FIG. 1.

Referring to FIGS. 8 and 9, where the pages (PAGE=1 and PAGE=2) to which sub objects A and B of FIGS. 5 and 6 are used by other objects A' and B' of different application data (e.g., as in FIG. 7), the virtual addresses of sub objects A and B may be changed. In the example of FIGS. 8 and 9, because the pages (PAGE=1 and PAGE=2) to which sub objects A and B of FIGS. 5 and 6 are assigned are changed to new pages (PAGE=3 and PAGE=4), virtual addresses VA_A and VA_B of sub objects A and B are changed. Accordingly, new mapping relationships with respect to sub objects A and B are generated. That is, virtual objects VA_A and VA_B that are mapped with physical addresses PA_A and PA_B of sub objects A and B are changed. The remapping relationship between the virtual addresses and the physical addresses may be updated in object descriptor ODP of FIG. 4.

Figure 10:
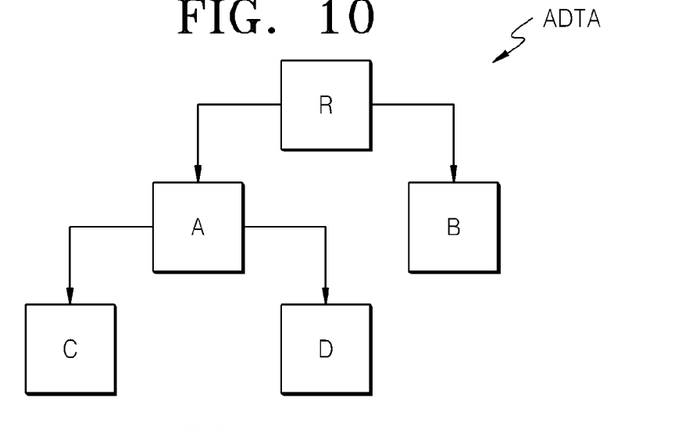
FIG. 10 is a diagram of application data according to another embodiment of the inventive concept.

FIG. 10 is a diagram illustrating another example of application data ADTA according to the embodiment of the inventive concept.

Referring to FIG. 10, application data ADTA further comprises child objects C and D that are referenced by sub objects A and B, with root object R and sub objects A and B. In the example shown in FIG. 10, sub object A comprises child objects C and D. Although child objects C and D are child objects of sub objects A and B, child objects C and D may be referenced by root object R via sub objects A and B, so child objects C and D may be considered as sub objects A and B with respect to root object R.

Figure 11:
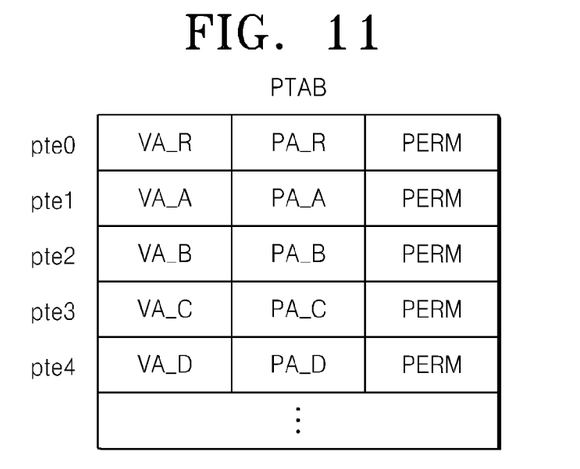
FIG. 11 is a diagram illustrating a page mapping table for the application data shown in FIG. 10.
Figure 12:
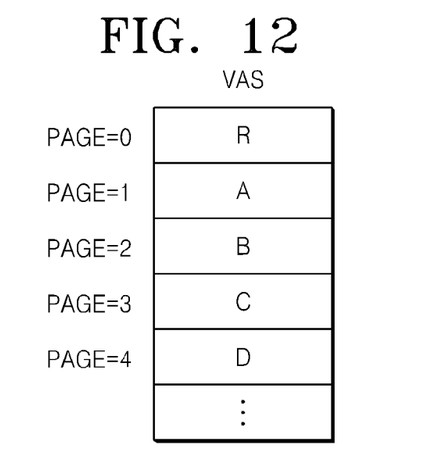
FIG. 12 is a diagram illustrating mapping relationships shown in the page mapping table of FIG. 11.

FIG. 11 shows a page mapping table PTAB of objects R, A, B, C, and D in application data ADTA of FIG. 10. The virtual addresses of objects R, A, B, C, and D of application data ADTA having the mapping relationship shown in page mapping table PTAB of FIG. 11 may be assigned to pages (PAGE=0 through 4), as shown in FIG. 12.

In application data ADTA of FIG. 10, where the pages of the virtual address according to the mapping relationship stored in the object descriptor ODP are used when application data ADTA is opened, like in FIG. 7, that is, if the pages (PAGE=1 and PAGE=2) to which the object objects A and B of FIGS. 5 and 6 are assigned are used by objects A' and B' of another application data, the pages (PAGE=1 and PAGE=2) to which sub objects A and B are assigned may be changed to new pages (PAGE=3 and PAGE=4), as shown in FIGS. 8 and 9.

Figure 13:
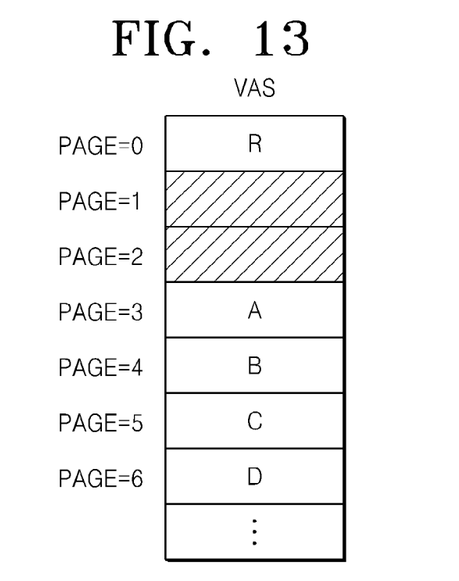
FIGS. 13 and 14 are diagrams illustrating examples of a page remapping method due to a page conflict in the mapping relationships shown in the page mapping table of FIG. 11.

However, the pages (PAGE=3 and PAGE=4) to which sub objects A and B are newly assigned due to the above conflict are the pages to which child objects C and D of application data ADTA of FIG. 10 have been assigned. Therefore, the virtual addresses of the pages (PAGE=3 and PAGE=4) to which child objects C and D have been assigned may be changed to pages PAGE=5 and PAGE=6, as shown in FIG. 13. In addition, the new mapping relationships of sub objects A and B and child objects C and D may be updated in object descriptor ODP of application data ADTA.

Figure 14:
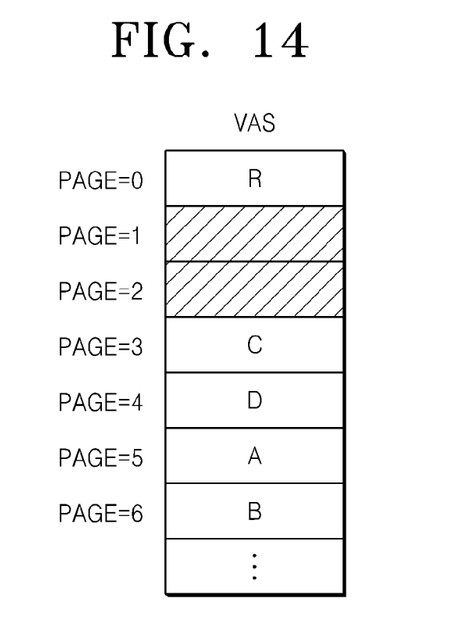

To prevent successive remapping of the child objects according to the remapping of the sub objects, the mapping information stored in the object descriptor is searched when opening the application data so that the virtual addresses of the pages, to which the sub objects will be newly assigned, may be other pages except for the pages included in the mapping information. In the example of FIG. 14, sub objects A and B of FIG. 10 may be newly assigned to pages PAGE=5 and PAGE=6, to which any of the other objects R, C, and D of FIG. 10 are not assigned.

Figure 15:
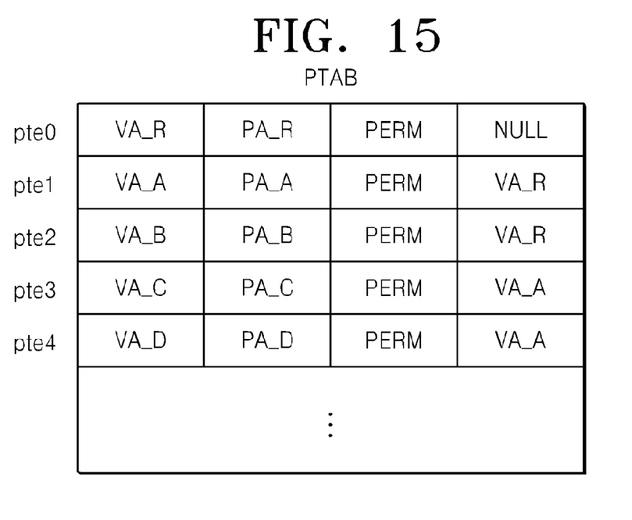
FIG. 15 is a diagram illustrating a page mapping table according to another embodiment of the inventive concept.

FIG. 15 is a diagram illustrating an example of a page mapping table according to another embodiment of the inventive concept.

Referring to FIG. 15, page mapping entries pte0 through pte4 in page mapping table PTAB of FIG. 15 additionally comprise information about objects referencing objects assigned to corresponding pages. For example, in the embodiment of FIG. 15, page mapping entry pte1 comprises a virtual address VA_A and a physical address PA_A of an object A assigned to the corresponding page and access right PERM to the corresponding page, and further comprises information (or virtual address) VA_R of a root object R that references the object A. In addition, page mapping entry pte2 comprises a virtual address VA_B and a physical address PA_B of an object B assigned to the corresponding page and access right PERM to the corresponding page, and further comprises information (or virtual address) VA_R of root object R that references object B.

Where page mapping table PTAB of FIG. 15 is page mapping table PTAB of application data ADTA shown in FIG. 10, it may comprise page mapping entries pte3 and pte4 corresponding to pages to which child objects C and D are assigned. In this case, page mapping entries pte3 and pte4 may respectively comprise information about sub object A that is referenced.

As illustrated in FIG. 15, where each of the page mapping entries further comprises information about a parent object of the corresponding object, where the objects of the application data are opened, not all of the objects may be opened, but the objects for which access is requested may be only opened. For example, access is requested for object C of application data ADTA shown in FIG. 10, root object R, sub object A, and the child object C may only be opened with reference to information about the referenced objects shown in the page mapping entries shown in FIG. 15. This can reduce the opening time of the object.

Figure 16:
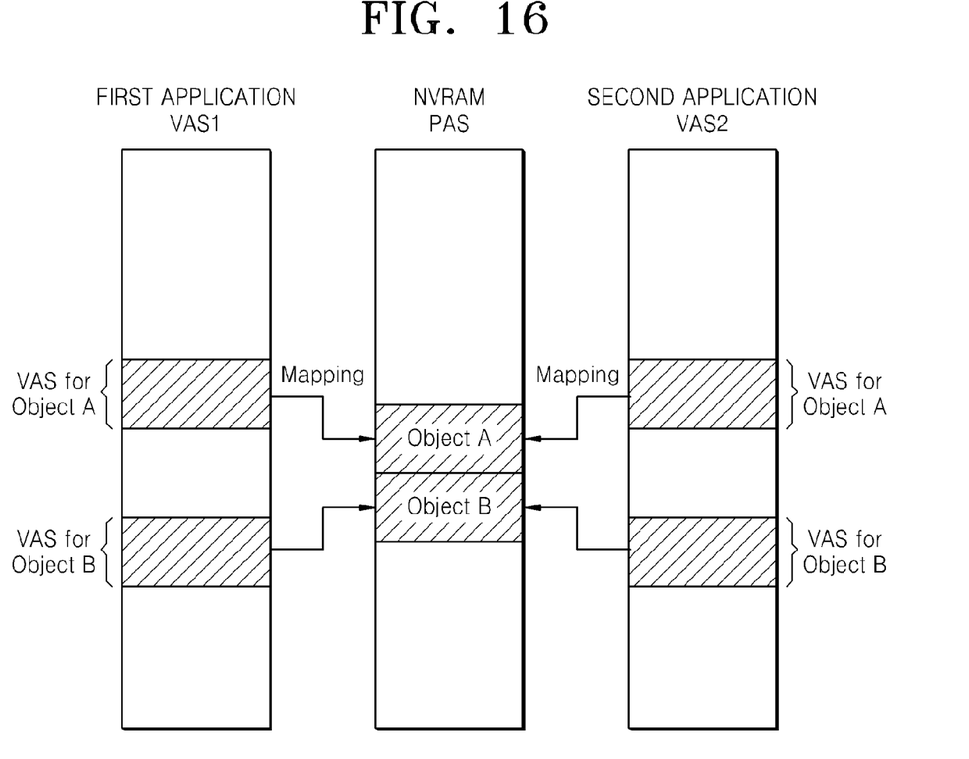
FIG. 16 is a diagram illustrating a mapping method according to another embodiment of the inventive concept.

FIG. 16 is a diagram illustrating a mapping method according to another embodiment of the inventive concept.

Referring to FIG. 16, a fixed physical address is mapped to some virtual addresses with respect to each of the objects. For example, first objects A and second objects B shown in FIG. 16 are respectively mapped to their own physical addresses (slanted portion of PAS). This can be used to avoid a problem such as the conflict shown in FIG. 7.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:
1. A method of managing data in a system comprising a nonvolatile memory, comprising:

storing a root object of application data, and at least one sub object referenced by the root object in the nonvolatile memory;

mapping virtual addresses of the root object and the at least one sub object to physical addresses of the nonvolatile memory respectively, in a page unit, wherein the root object stored in the nonvolatile memory comprises a pointer that references the at least one sub object stored in the nonvolatile memory;

determining whether a page to which the at least one sub object is assigned is used; and upon determining that the page to which the at least one sub object is assigned is used, remapping the virtual address of the at least one sub object to a physical address by changing a virtual address of the page to which the at least one sub object is assigned.

2. The method of claim 1, wherein the application data comprises first application data executed by a first process and second application data executed by a second process, and the mapping comprises assigning the root object and the at least one sub object of the first application data and the root object and the at least one sub object of the second application data to different pages from each other.

3. The method of claim 1, wherein the application data further comprises at least one child object that is referenced by the at least one sub object, and the remapping of the virtual address comprises changing the virtual address of the at least one sub object to a virtual address without changing a virtual address of the at least one child object.

4. The method of claim 3, when the application data further comprises the at least one child object that is referenced by the at least one sub object, the remapping of the virtual address comprises changing a virtual address of the at least one child object to another virtual address where the changed virtual address of the at least one sub object is the same as the virtual address of the at least one child object.

5. The method of claim 1, wherein the mapping is performed with reference to page mapping entries indicating mapping relationships between virtual addresses and physical addresses of the root object and the at least one sub object respectively, with respect to each of the pages.

6. The method of claim 5, wherein each of the page mapping entries comprises a virtual address, a physical address of a corresponding object, and access right to the corresponding object.

7. The method of claim 5, wherein the page mapping entry comprises a virtual address and a physical address of the corresponding object, access right to the corresponding address, and information about an object that references the corresponding object.

8. The method of claim 7, wherein the root object comprises two or more sub objects and at least one of the two or more sub objects is only allowed to be opened while the root object is opened.

9. The method of claim 1, wherein the virtual addresses of the root object and the at least one sub object are respectively mapped to their own physical addresses.

10. The method of claim 1, wherein the nonvolatile memory is accessible in byte units.

11. A method of managing data in a system comprising a nonvolatile memory, comprising:

receiving application data comprising a root object, and at least one sub object that is referenced by the root object;

storing the root object and the at least one sub object of the application data in the nonvolatile memory, wherein the root object stored in the nonvolatile memory includes a pointer for referencing the at least one sub object stored in the nonvolatile memory;

mapping virtual addresses of the root object and the at least one sub object to physical addresses of the nonvolatile memory respectively, in a page unit;

determining whether a page to which the at least one sub object is assigned is used; and upon determining that the page to which the at least one sub object is assigned is used, remapping the virtual address of the at least one sub object to a physical address by changing a virtual address of the page to which the at least one sub object is assigned.

12. The method of claim 11, wherein the nonvolatile memory is a main memory or an external storage device of the system.

13. The method of claim 11, wherein the system further comprises a main memory or an external storage device.

14. The method of claim 11, wherein the application data comprises first application data executed by a first process and second application data executed by a second process, and the mapping comprises assigning the root object and the at least one sub object of the first application data and the root object and the at least one sub object of the second application data to different pages from each other.

15. A system, comprising:

a processor configured to execute an application using application data; and a nonvolatile memory configured to store a root object of application data, and at least one sub object referenced by the root object, wherein the root object stored in the nonvolatile memory comprises a pointer that references the at least one sub object stored in the nonvolatile memory, wherein the processor is configured to map virtual addresses of the root object and the at least one sub object to physical addresses of the nonvolatile memory respectively, in a page unit, determine whether a page to which the at least one sub object is assigned is used, and upon determining that the page to which the at least one sub object is assigned is used, remap the virtual address of the at least one sub object to a physical address by changing a virtual address of the page to which the at least one sub object is assigned.

16. The system of claim 15, wherein the nonvolatile memory functions as a main memory of the system.

17. The system of claim 16, further comprising an external storage device configured to store the application data.

* * * * *